Patented Oct. 29, 1940

2,219,368

UNITED STATES PATENT OFFICE 2,219,368

DIASTATIC SACCHARIFICATION PROCESS

William K. McPherson and Leo M. Christensen, Atchison, Kans., assignors to The Chemical Foundation, Incorporated, a corporation of Delaware No Drawing. Application March 22, 1938, Serial No. 197,424

7 Claims. (Cl. 195—24)

In the production of ethyl alcohol from grains or other starchy materials by yeast fermentation, it is first necessary to convert the starch to fermentable carbohydrates such as maltose and dextrose. This saccharification is ordinarily done with barley malt, which is added to the cooked mash in the proportion of about 10 parts of ground barley malt to 100 parts of grain. Mashing conditions vary, but it is customary to conduct the mashing operation at about 60° C. for about 45 minutes, after which the mash is cooled to fermentation temperature, about 30° C., and pumped to the fermenting vessels where it is inoculated with yeast and allowed to ferment about three days.

This procedure usually results in the conversion of about 85 per cent of the available carbohydrates of grains to ethyl alcohol and carbon dioxide, the balance remaining in the beer in the form of dextrins which are not fermentable by yeast. That is, malt diastase does not completely convert the starch to maltose and dextrose, even with very low concentrations of grain and with larger malt ratios than the 1-10 generally used. Naturally, this failure to secure large conversions is a matter of concern, especially in the manufacture of fuel or power alcohol, where maximum economy and efficiency are essential.

Barley malt is a rather costly material, since one bushel of barley, 48 pounds, yields only 34 pounds of malt and this by a long procedure which must be very carefully conducted. Malt ordinarily costs three times as much as grain per pound.

Other saccharifying methods and reagents have been used at various times in efforts to find a lower cost and more efficient procedure. By heating with dilute mineral acids, starch may be converted to fermentable sugars but this method is generally less efficient than the saccharification with malt. Other diastatic materials have also been used, such as malted wheat, corn or rye and molds, especially the Aspergilli and the Mucors. These efforts have generally been unsuccessful and the use of barley malt is still generally the preferred procedure.

It is an object of our invention to produce ethyl alcohol from grains or other starchy materials by yeast fermentation in greater volumes and at lower costs than is practicable by the use of malt as the sole diastatic conversion agency. We attain these objects by increasing the efficiency of the conversion of starch to fermentable carbohydrates. Our invention consists in the discovery that by complementing the diastatic power of malt with the diastatic power of soybeans, the mixture has a conversion potency exceeding that of the sum of their diastatic values.

It has been known for a long time that some grains, especially rye, naturally contain small amounts of diastase. More recently soybeans have been found to possess even more marked diastatic power. The enzyme complex of the soybean is, however, not complete and it has not given very good results as compared with those secured with malt and therefore has not found use in the industry.

We have found that several combinations of malt and soybeans produce saccharification of starch in a considerably more effective manner than does malt or soybeans alone. Apparently neither enzyme complex is complete and when mixtures are used, the two diastases supplement each other to produce a new complex of greatly improved efficiency. This wholly unexpected result is of great commercial interest, first because of the improved alcohol yields obtainable and second because of the greatly decreased requirements of malt and consequent decreased cost of raw materials. Soybeans ordinarily cost about half as much as malt.

We carry our process into operation in any of several ways, all yielding essentially the same results. Whatever the procedure, we prefer to use soybeans to the extent of 3 to 5 per cent of the total grains to be saccharified and 1 to 5 per cent of barley malt. A typical ratio is 4 per cent of soybeans to 3 per cent of malt.

In one procedure we add the ground soybeans to the cooked mash when the temperature is 90° C. to 100° C., cooling as rapidly as convenient, say in 15 minutes, to 50° C. to 65° C. at which time the ground barley malt is added. The soybeans and malt must, of course, be added in finely ground condition, or better yet, in a water dispersion made up and held at 15° C. to 25° C., and must be quickly stirred into the mash. The mash may be held about 30 to 45 minutes at about 60° C., and then cooled to fermenting temperature, about 30° C., and pumped to the fermenter, inoculated with yeast and allowed to ferment two to three days in the usual manner.

In an alternative procedure, we add a mixture of ground soybeans and malt, say 6 parts of soybeans and 4 parts of malt, at one time, in which case the addition is made to the cooked mash at 55° C. to 65° C. and held 30 to 45 minutes at this temperature, then pumped to the fermenter, inoculated with yeast and allowed to ferment in the usual manner.

We have also found the soybean-barley malt mixture of considerable value for thinning the mash before cooking. By adding about 1 per cent of this mixture to the grain before cooking, it is possible to cook very high concentration mashes without dangerous increases in mash viscosity as a result of hydration of the starch. Thus, we may cook effectively and easily a mash made up of 15 gallons of water, 60 pounds of grain and 0.6 pounds of soybean-barley malt mixture. This mash is, of course, too concentrated to be fermented economically and must be thinned with water before inoculation.

Typical results with our process are illustrated by the following comparison of data secured from fermentations of corn:

| Saccharifying agent | Alcohol yield per cent of theoretical |
|---|---|
| | Percent |
| Barley malt, (10% of corn) | 85 |
| Soybeans (10% of corn) | 80 |
| Soybeans (4% of corn) and barley malt (3% of corn) | 95 |

It will be understood that, whenever desired, the novel, balanced enzymatic material described herein, i. e., the soy bean diastase and barley malt, may be used in combination with other malting substances, such as germinated corn and rye.

Similarly, the mashing steps contemplated herein may be specially correlated with other mashing methods. For example, operations may be carried out in which a starchy material is first partially hydrolyzed to sugar by means of mineral acids and then, after suitable adjustment of the acidity, the mashing may be completed by the materials and in the manner described herein.

The invention is conceived to reside in the discovery and practical utilization of the unexpectable increase in saccharogenic action obtained by complementing enzymatic material of the type of that occurring in soy bean and barley malt respectively.

Having thus described our invention, we claim:

1. A saccharifying agent for saccharifying starch which comprises a water dispersion of grain malt and soy bean in the proportion of substantially 4 parts of soybeans to substantially 3 parts of malt.

2. A saccharifying agent for saccharifying starches to produce fermentable sugars which comprises a water dispersion of barley malt and soybean in the proportion of substantially 4 parts of soybeans to substantially 3 parts of malt.

3. A method of saccharifying starches to produce fermentable sugars which comprises, cooking a mash of starchy material, adding finely dispersed soybean to the mash while the latter is at a temperature of between 90° C. and 100° C., cooling the mash to between substantially 50° C. and 65° C., adding thereto a barley malt and maintaining the mash substantially at such temperature for the remainder of the malting period.

4. A method of saccharifying amylaceous material, to produce fermentable sugars, which comprises, cooking a mash of starchy material, adding finely dispersed soybean to the mash while the latter is maintained at a temperature of between substantially 90° C. and 100° C., cooling the mash to a temperature of between substantially 55° C. and 65° C., adding thereto a grain malt and maintaining the mash substantially at such temperature for the remainder of the malting period.

5. A method of saccharifying starch to produce fermentable sugars which comprises, cooking a mash of starchy material, adding a water dispersion of soybean material to the mash while the latter is at a temperature of between substantially 90° C. and substantially 100° C., cooling the mash to a temperature of between substantially 50° C. and 65° C., adding thereto a grain malt and maintaining the mash substantially at such temperature for the remainder of the malting period.

6. A saccharifying agent containing barley malt and soybeans in the proportion of substantially 3 parts of barley malt to 4 parts of soybeans.

7. A saccharifying agent for saccharifying starchy material which comprises soybeans and barley malt in the ratio of 3 to 5% of soybeans to 1 to 5% of malt on the basis of the total grain to be saccharified and in which agent the amount of soybean is in excess of the amount of barley malt.

WILLIAM K. McPHERSON.
LEO M. CHRISTENSEN.